(12) United States Patent
Katz et al.

(10) Patent No.: US 9,295,942 B2
(45) Date of Patent: Mar. 29, 2016

(54) PROCESS FOR SEPARATING OFF ACID GASES FROM A WATER-COMPRISING FLUID STREAM

(71) Applicant: BASF SE, Ludwigshafen (DE)

(72) Inventors: Torsten Katz, Neustadt (DE); Karsten Bartling, Neustadt (DE)

(73) Assignee: BASF SE, Ludwigshafen (DE)

( * ) Notice: Subject to any disclaimer, the term of this patent is extended or adjusted under 35 U.S.C. 154(b) by 212 days.

(21) Appl. No.: 14/018,520

(22) Filed: Sep. 5, 2013

(65) Prior Publication Data

US 2014/0065040 A1  Mar. 6, 2014

Related U.S. Application Data

(60) Provisional application No. 61/696,827, filed on Sep. 5, 2012.

(30) Foreign Application Priority Data

Sep. 5, 2012  (EP) .................................... 12183132

(51) Int. Cl.
*B01D 53/14*  (2006.01)
*B01D 53/40*  (2006.01)
*C10L 3/10*  (2006.01)

(52) U.S. Cl.
CPC ............ *B01D 53/40* (2013.01); *B01D 53/1418* (2013.01); *B01D 53/1425* (2013.01); *B01D 53/1456* (2013.01); *C10L 3/102* (2013.01); *B01D 53/1493* (2013.01); *B01D 2252/204* (2013.01); *B01D 2257/30* (2013.01);
(Continued)

(58) Field of Classification Search
CPC ............... B01D 53/14; B01D 53/1456; B01D 53/1462; B01D 53/1468; B01D 53/1475; B01D 53/1481; B01D 2257/30
See application file for complete search history.

(56) References Cited

U.S. PATENT DOCUMENTS

| | | | |
|---|---|---|---|
| 7,316,737 B2 * | 1/2008 | Mimura et al. | ................. 96/234 |
| 2004/0092774 A1 * | 5/2004 | Mimura et al. | ............... 564/497 |
| 2008/0159937 A1 | 7/2008 | Ouimet | |

(Continued)

FOREIGN PATENT DOCUMENTS

| AU | 2010264803 A1 * | 2/2012 | ............ B01D 53/14 |
|---|---|---|---|
| EP | 0502596 A1 | 9/1992 | |

(Continued)

*Primary Examiner* — Timothy Vanoy
(74) *Attorney, Agent, or Firm* — Drinker Biddle & Reath LLP (57) ABSTRACT

A process for separating off acid gases from a water-comprising fluid stream wherein the water-comprising fluid stream is contacted in an absorption zone with an absorbent, producing a deacidified fluid stream and an acid gas-loaded absorbent; the deacidified fluid stream is contacted in a scrubbing zone with an aqueous scrubbing liquid, producing a deaminated, deacidified fluid stream and an amine-loaded scrubbing liquid which is cooled, producing an absorber top condensate; the loaded absorbent is passed into a desorption zone producing a regenerated absorbent and desorbed acid gases; the regenerated absorbent is returned to the absorption zone in order to form an absorbent circuit, to which the amine-loaded scrubbing liquid and the absorber top condensate are introduced; and the desorbed acid gases are conducted through an enrichment zone and the acid gases exiting at the top of the enrichment zone are cooled, producing a desorber top condensate.

17 Claims, 3 Drawing Sheets

(52) U.S. Cl.
CPC ...... *B01D 2257/40* (2013.01); *B01D 2257/504* (2013.01); *B01D 2258/0283* (2013.01); *B01D 2258/05* (2013.01)

(56) References Cited

U.S. PATENT DOCUMENTS

| | | | |
|---|---|---|---|
| 2010/0229720 A1* | 9/2010 | Sonwane et al. | 95/46 |
| 2011/0135550 A1* | 6/2011 | Nagayasu et al. | 423/230 |
| 2012/0263627 A1* | 10/2012 | Fujita et al. | 422/119 |
| 2013/0137893 A1 | 5/2013 | Ebel et al. | |
| 2013/0230440 A1 | 9/2013 | Katz et al. | |
| 2013/0259780 A1* | 10/2013 | Handagama et al. | 423/220 |
| 2013/0259789 A1 | 10/2013 | Katz et al. | |
| 2013/0291717 A1* | 11/2013 | Nagayasu et al. | 95/13 |
| 2014/0241967 A1* | 8/2014 | Fujita et al. | 423/228 |
| 2015/0037238 A1* | 2/2015 | Chung et al. | 423/437.1 |

FOREIGN PATENT DOCUMENTS

| | | | | |
|---|---|---|---|---|
| EP | 0798029 | A2 | 10/1997 | |
| EP | 1132125 | A1 | 9/2001 | |
| EP | 1334759 | A1 | 8/2003 | |
| EP | 2228119 | A1 | 9/2010 | |
| EP | 2644255 | A4 * | 10/2014 | B01D 53/62 |
| EP | 2786793 | A1 * | 10/2014 | B01D 53/14 |

* cited by examiner

PROCESS FOR SEPARATING OFF ACID GASES FROM A WATER-COMPRISING FLUID STREAM

CROSS-REFERENCE TO RELATED APPLICATIONS

This application claims benefit of U.S. Provisional Application Ser. No. 61/696,827, filed Sep. 5, 2012, and European Patent Application No. 12183132.5, filed Sep. 5, 2012, both of which are incorporated herein by reference in their entirety.

BACKGROUND OF THE INVENTION

The present invention relates to a process for separating off acid gases from a water-comprising fluid stream.

Numerous fluid streams comprise acid gases such as $CO_2$, $H_2S$, $SO_2$, $CS_2$, HCN, COS, or mercaptans, for example. These fluid streams can be, for example, gas streams such as natural gas, refinery gas, synthesis gas, flue gases or reaction gases formed in the composting of waste materials comprising organic substances. The removal of acid gases from these fluid streams is desirable for various reasons.

The removal of carbon dioxide from flue gases serves, in particular, for reducing the emission of carbon dioxide, which is considered to be the main cause of what is termed the greenhouse effect.

Synthesis gas comprises substantially carbon monoxide and hydrogen. Synthesis gas is generally produced by partial oxidation or steam reforming of hydrocarbons. The crude synthesis gas comprises acid gases such as carbon dioxide, hydrogen sulfide or carbonyl sulfide, which must be removed.

The content of acid gases in natural gas is reduced by suitable treatment measures directly at the natural gas well, since these form corrosive acids in the water frequently entrained by the natural gas.

On an industrial scale, for removing acid gases such as carbon dioxide, from fluid streams, frequently aqueous solutions of organic bases are used as absorbents, e.g. amines such as, in particular, alkanolamines. On dissolution of acid gases, in this process ionic products form from the base and the acid gas components. The absorbent can be regenerated by heating, expansion to a lower pressure or stripping, wherein the ionic products back-react to form acid gases and/or the acid gases are stripped off by steam. After the regeneration process, the absorbent can be reused.

The amines used, however, have a non-negligible vapor pressure. Therefore, the fluid stream freed from acid gases comprises traces of amines. Contamination of the treated fluid stream is undesirable for various reasons. For instance, it is disadvantageous if, together with the treated flue gas, traces of amines escape into the environment. Synthesis gas is the starting material for further catalytic reactions. Amine traces in this case can act as a catalyst poison. The content of amines in natural gas or the Liquefied Petroleum Gas (LPG) produced therefrom by liquefaction can likewise be subject to restrictions.

In the prior art, it has been proposed to scrub the treated fluid stream with an aqueous liquid, to transfer entrained amine at least in part to the aqueous liquid.

EP 0 798 029 A2 discloses a process in which a gas is treated with a basic amine compound for the absorption of carbon dioxide and the treated gas is then contacted with an aqueous phase at 20 to 60° C. in order to transfer entrained basic amine at least in part to the aqueous phase. The aqueous phase is said preferably to be a condensate which is condensed out from the carbon dioxide liberated in the regeneration tower.

EP 0 502 596 A1 teaches a process for removing $CO_2$ from a combustion off-gas, wherein the combustion off-gas is contacted, in a first section, with an absorbent which comprises an aqueous solution of an alkanolamine, water is condensed out of the combustion off-gas by cooling, and the water that is condensed out is contacted in a second section with the combustion off-gas that is depleted in carbon dioxide.

EP 1 132 125 A1 discloses a process for controlling the concentration of an absorbent in a system for separating off $CO_2$, wherein the temperature of the circulating water in a scrubbing zone is controlled in dependence on liquid level in the sump of the absorption tower.

EP 1 334 759 A1 teaches a process and a device for recovering amine, wherein amine which is present in gas stream freed from $CO_2$ is removed from the gas stream by a plurality of successive scrubbing steps.

US 2008/0159937 comprises a process for removing carbon dioxide from a gas stream, in which the gas stream which is depleted in carbon dioxide is scrubbed with water in a packed section of the absorption column. The water can be condensate from the top of the regeneration column or fresh water for compensation of amounts lost.

An acid gas removal system continuously loses water in the form of steam, which is removed via the treated fluid stream and the acid gases that are released, or owing to other physical losses. In order to compensate for the losses and to maintain the water balance of the system, it is therefore generally necessary to add fresh water periodically to the absorbent circuit to compensate for amounts lost (makeup water). The fresh water for compensating for amounts lost should not comprise dissolved substances and is, e.g., demineralized water or steam condensate.

On the other hand, under certain conditions, more water can be introduced into the acid gas removing system than is removed via the treated fluid stream and the acid gases released. This is the case, in particular, if (i) the fluid stream that is to be treated has a high water content or is saturated with water vapor, (ii) the treated fluid stream is greatly cooled in the scrubbing zone or downstream of the scrubbing zone in order to ensure efficient amine retention, and/or (iii) the fluid stream that is to be treated has a relatively low acid gas content and the volumetric flow rate of the acid gases released in the regenerator is therefore small.

In these cases it is necessary to remove water from the acid gas removing system in order to prevent uncontrolled dilution of the absorbent by water condensed therein.

EP 2 228 119 A1 teaches a process for removing acid gases from a gas in which a part of the water present in the acid gases obtained is removed. This can be achieved in that a part of the regenerator top condensate is removed and not passed as reflux to the regenerator.

The condensate streams of an acid gas removing system comprise greater or lesser amounts of amines. When a subquantity of a condensate stream is discharged, small amounts of amines are therefore continuously withdrawn from the system. This causes economic and ecological problems. Firstly, the waste water, for safe disposal, must be treated in a complex manner. Secondly, the amine losses must be continuously or periodically replaced. Although there would be the possibility of recovering amines present from the discharged condensate, e.g. by distillation, such methods, owing to their high energy demand, are generally not economically viable.

The object of the present invention is to specify a process for removing acid gases from water-comprising fluid streams, in particular for removing acid gases from natural gas, which substantially permits without additional energy demand an efficient retention of amines from the treated fluid streams, with safeguarding of the water balance of the acid gas removing system.

BRIEF SUMMARY OF THE INVENTION

The object is achieved by a process for separating off acid gases from a water-comprising fluid stream, in which
  a) the water-comprising fluid stream is contacted in an absorption zone with an absorbent that comprises at least one amine, wherein a deacidified fluid stream and an acid gas-loaded absorbent is obtained,
  b) the deacidified fluid stream is contacted in a scrubbing zone with an aqueous scrubbing liquid, in order to transfer entrained amine at least in part to the scrubbing liquid, wherein a deaminated, deacidified fluid stream and an amine-loaded scrubbing liquid are obtained,
  c) the deaminated, deacidified fluid stream is cooled downstream of the scrubbing zone, wherein an absorber top condensate is condensed out of the deaminated, deacidified fluid stream,
  d) the loaded absorbent is passed into a desorption zone in which the acid gases are at least in part released, wherein a regenerated absorbent and desorbed acid gases are obtained,
  e) the regenerated absorbent is returned to the absorption zone in order to form an absorbent circuit,
  f) the amine-loaded scrubbing liquid and the absorber top condensate are introduced into the absorbent circuit, and
  g) the desorbed acid gases are conducted through an enrichment zone and the acid gases exiting at the top of the enrichment zone are cooled, in order to condense out of the acid gases a desorber top condensate which in part is returned to the enrichment zone and in part is passed out of the process.

DETAILED DESCRIPTION OF THE INVENTION

The water-comprising fluid stream is contacted with an absorbent that comprises at least one amine in an absorption zone. In this process an at least partially deacidified fluid stream (in the present case termed deacidified fluid stream) is obtained, and an absorbent loaded with acid gases is obtained. The treatment of the fluid stream with the absorbent preferably proceeds in counterflow. The fluid stream in this case is generally fed into a lower region and the absorbent into an upper region of the absorption zone. For improving the contact and providing a large mass transfer surface area, the absorption zone generally comprises internals, e.g. packed beds, packings and/or trays. The fluid stream is treated with the absorbent in a suitable manner in an absorption tower or absorption column, e.g. a randomly packed column, structured packing column or tray column. The absorption zone is considered to be the section of an absorption column in which the fluid stream comes into mass transfer contact with the absorbent.

The temperature of the absorbent introduced into the absorption zone is generally about 20 to 60° C.

The deacidified fluid stream is then contacted in a scrubbing zone with an aqueous scrubbing liquid, in order to transfer entrained amine at least in part into the scrubbing liquid. In this process, a deaminated, deacidified fluid stream and an amine-loaded scrubbing liquid are obtained. The scrubbing according to the invention of the deacidified fluid stream using the aqueous scrubbing liquid allows the removal of the majority of the entrained amine and also optionally of entrained amine decomposition products.

As aqueous scrubbing liquid, aqueous liquids are suitable that are largely free from amines and amine decomposition products. Typically, the scrubbing liquid comprises less than 2% by weight, preferably less than 1% by weight, particularly preferably less than 5000 ppm by weight of amines and amine decomposition products. The scrubbing liquid can be intrinsic liquids, i.e. aqueous liquids that arise at another site of the process, or externally supplied aqueous liquids.

Preferably, the scrubbing liquid comprises absorber top condensate, desorber top condensate and/or fresh water.

In preferred embodiments, the scrubbing liquid is formed in whole or in part by absorber top condensate which arises in the downstream cooling of the deaminated, deacidified fluid stream and is passed into the scrubbing zone. In order to achieve sufficient wetting of the internals in the scrubbing zone, it can be desirable, in addition to pass further aqueous liquid into the scrubbing zone. In a preferred embodiment, therefore, some of the desorber top condensate is passed as scrubbing liquid into the scrubbing zone. The use of the desorber top condensate as additional aqueous liquid is preferred because it is without effect on the water balance of the overall system and this aqueous phase is largely free from amine impurities. In certain embodiments, the scrubbing liquid in addition comprises fresh water (makeup water), which is passed into the scrubbing zone.

In certain cases, it can be preferred that the scrubbing liquid does not comprise an absorber top condensate and is formed, e.g., exclusively of desorber top condensate and/or fresh water. This is the case, e.g., when the absorber top condensate comprises volatile hydrophobic components, such as hydrocarbons, which, together with the aqueous condensate, are condensed out of the deaminated, deacidified fluid stream. The two-phase absorber top condensate can, in these cases, lead to unwanted foam formation in the scrubbing zone. In these cases, it can be advantageous to combine the absorber top condensate with the loaded absorbent, e.g. by passing the absorber top condensate into an expansion vessel described hereinafter.

In the scrubbing zone, the scrubbing liquid is conducted in counterflow against the deacidified fluid stream. Preferably, the scrubbing zone comprises random packings, structured packings and/or trays in order to intensify the contact between the fluid stream and the scrubbing liquid. The scrubbing liquid can be distributed over the cross section of the scrubbing zone by suitable liquid distributors above the scrubbing zone.

In preferred embodiments, the scrubbing zone is constructed as a section of an absorption column arranged above the absorption zone. The scrubbing zone for this purpose is a section constructed as backwash section or enrichment part of the absorption column above the feeding of the absorbent.

In one embodiment, the scrubbing liquid is recycled via the scrubbing zone. The scrubbing liquid is collected for this purpose below the scrubbing zone, e.g. by a suitable collecting tray, and pumped via a pump to the top end of the scrubbing zone. The recycled scrubbing liquid can be cooled, preferably to a temperature of 20 to 70° C., in particular 30 to 60° C. For this purpose the scrubbing liquid is expediently pumped in circulation via a cooler. In order to avoid an accumulation of scrubbed absorbent components in the scrubbing liquid, a substream of the scrubbing liquid is passed out of the scrubbing zone as amine-loaded scrubbing liquid. By the recycling and optional cooling of the scrubbing liquid, the scrubbing action can be increased. By the recycling, however, back mixing of the scrubbing liquid occurs. At high recycling ratios, in the scrubbing zone, only a maximum effect of a theoretical separation stage can be achieved, independently of the length of the contact section in the scrubbing zone. The recycling ratio is defined as the ratio of the amount of the scrubbing liquid pumped in circulation to the amount of the substream passed out. When the scrubbing liquid is recycled, therefore, only a limited decrease in concentration of entrained amines in the deacidified fluid stream can be achieved. Recycling the scrubbing liquid is therefore not preferred.

In a preferred embodiment, the aqueous scrubbing liquid is conducted in a single pass through the scrubbing zone without pumping it in circulation. The scrubbing liquid flowing out of the scrubbing zone is preferably passed into the absorption zone.

After it leaves the scrubbing zone, the deaminated, deacidified fluid stream is water-vapor-saturated. With the water vapor, the deaminated, deacidified fluid stream still entrains traces of amines and/or amine decomposition products. For a further going removal of the entrained amines and/or amine decomposition products, the deaminated, deacidified fluid stream is cooled downstream (based on the direction of flow of the deaminated, deacidified fluid stream) of the scrubbing zone, wherein an aqueous condensate is condensed out. The aqueous condensate is in the present case termed absorber top condensate.

The deaminated, deacidified fluid stream is preferably cooled to a temperature of 5° C. to 40° C., particularly preferably to a temperature of 17° C. to 27° C. Expediently, the deaminated, deacidified fluid stream is cooled to a temperature which is lower than the temperature of the water-comprising fluid stream. The temperature difference between the cooled deaminated, deacidified fluid stream and the water-comprising fluid stream is, eg, at least 2 K, preferably at least 5 K, particularly preferably at least 10 K, most preferably 10 to 30 K. With an increasing temperature difference, a growing fraction of the water present in the deacidified water-comprising fluid stream is condensed out as absorber top condensate along with residual amounts of amine dissolved therein.

The cooling of the deaminated, deacidified fluid stream downstream of the scrubbing zone preferably proceeds by indirect heat exchange (indirect cooling). As indirect cooler, all heat exchangers are suitable that are suitable for cooling gases or fluids. Suitable heat exchangers are, eg, shell and tube heat exchangers. The deaminated, deacidified fluid stream flows downwards through the tubes of the heat exchanger. Cooling medium flows upwards through the shell of the heat exchanger. During the cooling of the deaminated, deacidified fluid stream, liquid condenses in the tubes and flows downwards. For separating off the absorber top condensate, a phase separation unit or a separator (knock-out drum) is used.

Since the absorber top condensate comprises only very small amounts of dissolved amines and/or amine decomposition products, it can be passed as scrubbing liquid into the scrubbing zone.

In order to avoid a loss of the amines present in the amine-loaded scrubbing liquid and in the absorber top condensate, the amine-loaded scrubbing liquid and the absorber top condensate are introduced into the absorbent circuit. This can proceed by direct or indirect combination with the loaded and/or regenerated absorbent.

Direct combination with the absorbent is taken to mean the direct introduction of the amine-loaded scrubbing liquid and/or of the absorber top condensate into the loaded and/or regenerated absorbent, for instance into a conduit which conducts loaded or regenerated absorbent, or into the bottom of the absorption column or desorption column. Indirect combination with the absorbent is taken to mean that the amine-loaded scrubbing liquid and/or the absorber top condensate is first used, eg, for scrubbing or cooling fluid streams, but finally combined with the loaded and/or regenerated absorbent.

Generally, it is preferred to pass the amine-loaded scrubbing liquid into the absorption zone in which the amine-loaded scrubbing liquid is combined with the absorbent. The absorber top condensate is preferably passed as scrubbing liquid into the scrubbing zone.

The absorbent loaded with acid gases is passed into a desorption zone in which the acid gases are at least in part released. In this process, a regenerated absorbent that is returned to the absorption zone, and desorbed acid gases are obtained.

Generally, the loaded absorption liquid is regenerated by heating, eg. to 70 to 150° C., expansion, stripping with an inert fluid, or a combination of two or all of these measures. Preferably, the loaded absorption liquid is regenerated in a stripper. The stripping gas required for the stripping is generated by partial evaporation of the absorption liquid in the sump of the stripper.

The preferred configuration of the desorption depends on the pressure in the absorption zone. If the water-comprising fluid stream has a pressure greatly increased in comparison to the surrounding atmosphere of 20 to 120 bar, preferably 35 to 95 bar, particularly preferably 50 to 70 bar, for the desorption, expansion to a pressure of 0.5 to 5 bar, preferably 0.7 to 3.5 bar, particularly preferably 0.9 to 2.0 bar is suggested. If the water-comprising fluid stream has a pressure of 0.5 to 5 bar, preferably 0.7 to 3.5 bar, particularly preferably 0.9 to 2.0 bar, for the desorption heating the absorbent loaded with acid gases to a temperature of 20 to 150° C., preferably 100 to 140° C., particularly preferably 110 to 130° C. is suggested. In a preferred embodiment, for the regeneration of the absorbent loaded with acid gases, it is expanded and heated in the desorption zone.

In a preferred embodiment, the loaded absorbent is expanded into an expansion vessel, wherein a gas phase and an expanded absorbent are obtained. The expanded absorbent is then passed into the desorption zone. In the expansion, co-absorbed components of the fluid stream such as inert gases, oxygen and/or hydrocarbons are released. In the expansion, a small part of the acid gases can also be released.

In the expansion vessel, the pressure is preferably set in such a manner that the majority of the acid gases is not released. In certain embodiments, the pressure in the expansion vessel can be 1.0 to 9 bar, preferably 1.5 to 6 bar. The pressure can be only slightly higher or even less than the pressure in the desorption zone, for which reason the expanded absorbent is pumped in certain embodiments from the expansion vessel to the desorption zone.

In certain embodiments, the absorber top condensate is passed in whole or in part into the expansion vessel and thus introduced into the absorbent circuit. This is preferred when the absorber top condensate comprises volatile hydrophobic components such as hydrocarbons. In the expansion vessel, the volatile components of the absorber top condensate can escape together with the gas phase.

Before the regenerated absorbent is introduced again into the absorption zone, it is cooled to a suitable absorption temperature. In order to utilize the energy present in the hot regenerated absorbent, it is preferred to preheat the loaded absorbent from the absorption zone by indirect heat exchange with the hot regenerated absorbent. Via the heat exchange, the loaded absorbent is brought to a higher temperature in such a manner that, in the regeneration step, a lower energy input is required. Via the heat exchange, also, partial regeneration of the loaded absorbent can already proceed with release of acid gases.

The desorbed acid gases are conducted according to the invention through an enrichment zone. The acid gases exiting at the top of the enrichment zone are cooled in order to condense out an aqueous phase which is termed in the present case desorber top condensate. The desorber top condensate is in part returned as reflux to the enrichment zone and in part passed out of the process. By passing out a part of the desorber top condensate, the water balance of the overall system is maintained, and accumulation of water in the system avoided. The passing out can be performed, e.g., using a controllable reflux divider. A part of the desorber top condensate is passed out, preferably, in accordance with maintenance of the water balance of the process. Parameters such as the liquid level in certain vessels of the absorbent circuit or the concentration of the amine in the absorbent can be measured continuously or periodically, and used for controlling the amount of the desorber top condensate that is passed out. A suitable range of the absorbent circuit for the liquid level measurement is distinguished in that the fill level rises on accumulation of water in the absorbent circuit and falls on loss of water. Preferably, the liquid level measurement proceeds in the sump of the desorption column or in a buffer vessel which communicates with the absorbent circuit.

The enrichment zone through which the desorbed acid gases are passed is preferably arranged above the desorption zone and, in a particularly preferred embodiment, arranged above the desorption zone and integrated into the desorption column. The enrichment zone suitably has a structured packing, a random packing and/or a plurality of trays. Preferably, the structured packing or the random packing has a height of at least 1.5 meters, in particular at least 1.8 meters. The height of the structured packing or random packing is, e.g., up to 3.0 meters. The geometric surface area of the structured packing of the enrichment zone can be between 100 and 600 $m^2/m^3$, preferably between 140 and 500 $m^2/m^3$, particularly preferably between 180 and 400 $m^2/m^3$.

If the enrichment zone comprises trays, the number of trays is preferably at least 4, in particular at least 5, more preferably at least 6, and most preferably at least 8. The number of the trays can be up to 14, preferably up to 12 or up to 10. A tray count of 6 to 10 is generally preferred.

In the enrichment zone, traces of the amines entrained by the released acid gases are expelled by the return of a part of the desorber top condensate, in such a manner that the acid gases exiting at the top of the enrichment zone are largely free from amine impurities. The desorber top condensate that is condensed out of the acid gases exiting at the top of the enrichment zone is therefore likewise largely free from amine impurities and can in part be passed out of the process without significant amine loss. The higher is the separation efficiency of the enrichment zone, the lower are the losses of amines via the acid gas stream.

The desorber top condensate comprises less than 500 ppm by weight, preferably less than 300 ppm by weight, further preferably less than 200 ppm by weight, particularly preferably less than 100 ppm by weight, very particularly preferably less than 50 ppm by weight, most preferably less than 30 ppm by weight of amines and amine decomposition products.

The process according to the invention is suitable for treating water-comprising fluid streams, in particular water-comprising gas streams of all types. The acid gases are, in particular, $CO_2$, $H_2S$, COS and mercaptans. In addition, $SO_3$, $SO_2$, $CS_2$ and HCN can also be removed. Generally, the acid gases comprise at least $CO_2$ or predominantly comprise $CO_2$.

In a preferred embodiment, the water-comprising fluid stream has a water content of at least 20%, preferably at least 30%, particularly preferably at least 40%, of the saturation concentration of water. The saturation concentration is taken to mean the concentration of water or water vapor in the fluid stream under the conditions of temperature and pressure at which the fluid stream is introduced into the absorption zone, on the excedence of which, water forms a separate phase in the fluid stream owing to falling below the dew point.

In a preferred embodiment, the water-comprising fluid stream is conducted into the absorption zone at a pressure of 20 to 120 bar, preferably 35 to 95 bar, particularly preferably 50 to 70 bar.

All of the pressures cited in the present document are absolute pressures.

In an alternative preferred embodiment, the water-comprising fluid stream is conducted into the absorption zone at a pressure of 0.1 to 10 bar, preferably 0.3 to 3 bar, particularly preferably 0.6 to 1.5 bar.

In a preferred embodiment, the water-comprising fluid stream has an acid gas partial pressure which is 2.5 bar or less, preferably 1 bar or less, particularly preferably 500 mbar or less.

Water-comprising fluid streams which comprise the acid gases are firstly gases such as natural gas, synthesis gas, coke oven gas, cracked gas, coal gasification gas, circulation gas, landfill gases and combustion gases, and secondly liquids which are substantially immiscible with the absorbent, such as Liquefied Petroleum Gas (LPG) or Natural Gas Liquids (NGL).

In preferred embodiments, the water-comprising fluid stream is a
  (i) hydrogen-comprising fluid stream; these include synthesis gases, which can be produced, eg, by coal gasification or steam reforming and are optionally subjected to a water gas shift reaction; the synthesis gases are used, eg, for producing ammonia, methanol, formaldehyde, acetic acid, urea, for the Fischer-Tropsch synthesis or for energy recovery in an Integrated Gasification Combined Cycle (IGCC) process;
  (ii) hydrocarbon-comprising fluid stream; these include natural gas, off-gases of various refinery processes, such as of the Tailgas Unit (TGU), of a Visbreaker (VDU), of a catalytic cracker (LRCUU/FCC), of a Hydrocracker (HCU), of a Hydrotreater (HDS/HTU), of a coker (DCU), of an atmospheric distillation (CDU) or of a liquid treater (eg. LPG).

The process according to the invention is suitable for treating oxygen-comprising fluid streams, such as flue gases.

In preferred embodiments, the oxygen-comprising fluid stream originates from
a) the oxidation of organic substances,
b) the composting or storage of waste materials comprising organic substances, or
c) the bacterial decomposition of organic substances.

In some embodiments, the partial pressure of carbon dioxide in the fluid stream is less than 500 mbar, e.g. 30 to 150 mbar.

The oxidation can be carried out with appearance of flame, i.e. as conventional combustion, or as oxidation without appearance of flame, e.g. in the form of a catalytic oxidation or partial oxidation. Organic substances that are subjected to the combustion are usually fossil fuels such as coal, natural gas, petroleum, petrol, diesel, raffinates or kerosene, biodiesel or waste materials having a content of organic substances. Starting materials of the catalytic (partial) oxidation are, e.g., methanol or methane, which can be converted to formic acid or formaldehyde.

Waste materials which are subjected to oxidation, composting or storage, are typically domestic refuse, plastic wastes or packaging refuse.

The combustion of the organic substances mostly proceeds in usual combustion plants with air. The composting and storage of waste materials comprising organic substances generally proceeds at landfills. The off-gas or the exhaust air of such systems can advantageously be treated by the process according to the invention.

Organic substances that are used for bacterial decomposition are usually stable manure, straw, liquid manure, sewage sludge, fermentation residues, silage and the like. The bacterial decomposition proceeds, e.g., in usual biogas plants. The exhaust air of such plants can advantageously be treated by the process according to the invention.

The process is also suitable for treating the off-gases of fuel cells or chemical synthesis plants that make use of a (partial) oxidation of organic substances.

The absorbent comprises at least one amine. Preferably, the amine comprises at least one primary or secondary amine.

Preferred amines are the following:
(i) amines of the formula I:

$$NR^1(R^2)_2 \qquad (I)$$

where $R^1$ is selected from $C_2$-$C_6$-hydroxyalkyl groups, $C_1$-$C_6$-alkoxy-$C_2$-$C_6$-alkyl groups, hydroxy-$C_1$-$C_6$-alkoxy-$C_2$-$C_6$-alkyl groups and 1-piperazinyl-$C_2$-$C_6$-alkyl groups and $R^2$ is independently selected from H, $C_1$-$C_6$-alkyl groups and $C_2$-$C_6$-hydroxyalkyl groups;
(ii) amines of the formula II:

$$R^3R^4N\text{---}X\text{---}NR^5R^6 \qquad (II)$$

where $R^3$, $R^4$, $R^5$ and $R^6$, independently of one another are selected from H, $C_1$-$C_6$-alkyl groups, $C_2$-$C_6$-hydroxyalkyl groups, $C_1$-$C_6$-alkoxy-$C_2$-$C_6$-alkyl groups and $C_2$-$C_6$-aminoalkyl groups and X is a $C_2$-$C_6$-alkylene group, $\text{---}X^1\text{---}NR^7\text{---}X^2\text{---}$ or $\text{---}X^1\text{---}O\text{---}X^2\text{---}$, where $X^1$ and $X^2$, independently of one another, are $C_2$-$C_6$-alkylene groups and $R^7$ is H, a $C_1$-$C_6$-alkyl group, $C_2$-$C_6$-hydroxyalkyl group or $C_2$-$C_6$-aminoalkyl group;

(iii) 5- to 7-membered saturated heterocycles having at least one nitrogen atom in the ring, which can comprise one or two further heteroatoms selected from nitrogen and oxygen in the ring, and
(iv) mixtures thereof.

Specific examples are:
(i) 2-aminoethanol(monoethanolamine), 2-(methylamino) ethanol, 2-(ethylamino)ethanol, 2-(n-butylamino)ethanol, 2-amino-2-methylpropanol, N-(2-aminoethyl)piperazine, methyldiethanolamine, ethyldiethanolamine, dimethylaminopropanol, t-butylaminoethoxyethanol, 2-aminomethylpropanol;
(ii) 3-methylaminopropylamin, ethylenediamine, diethylenetriamine, triethylenetetramine, 2,2-dimethyl-1,3-diaminopropane, hexamethylenediamine, 1,4-diminobutane, 3,3-iminobispropylamine, tris(2-aminoethyl)amine, bis(3-dimethylaminopropyl)amine, tetramethylhexamethylenediamine;
(iii) piperazine, 2-methylpiperazine, N-methylpiperazine, 1-hydroxyethylpiperazine, 1,4-bishydroxyethylpiperazine, 4-hydroxyethylpiperidine, homopiperazine, piperidine, 2-hydroxyethylpiperidine and morpholine; and
(iv) mixtures thereof.

In a preferred embodiment, the absorbent comprises at least one of the amines monoethanolamine (MEA), methylaminopropylamine (MAPA), piperazine, diethanolamine (DEA), triethanolamine (TEA), diethylethanolamine (DEEA), diisopropylamine (DIPA), aminoethoxyethanol (AEE), dimethylaminopropanol (DIMAP) and methyldiethanolamine (MDEA) or mixtures thereof.

Generally, the absorbent comprises 10 to 60% by weight amine.

The absorbent can also comprise additives, such as corrosion inhibitors, enzymes etc. Generally, the amount of such additives is in the range of about 0.01-3% by weight of the absorbent.

The invention will be described in more detail by the accompanying drawings and the subsequent examples.

Figure 1:
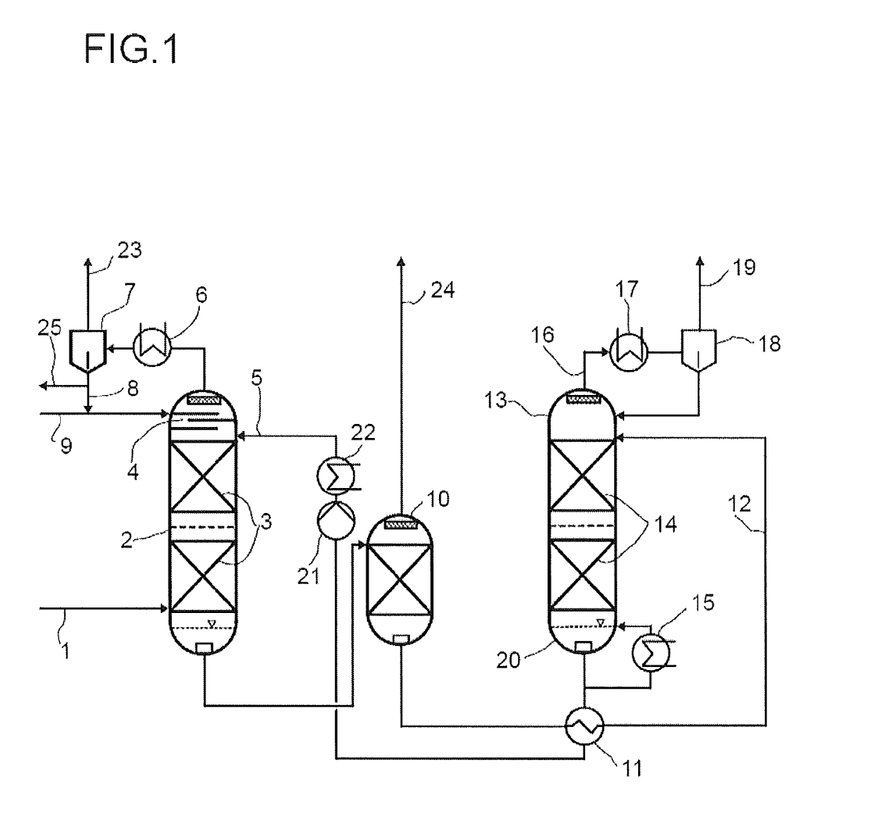
FIG. 1 shows schematically a plant for carrying out a process not according to the invention wherein, for maintenance of the water balance, some of the aqueous condensate is passed out of the deaminated, deacidified fluid stream.

FIG. 1 shows schematically a plant for carrying out a process not according to the invention wherein, for maintenance of the water balance, some of the aqueous condensate is passed out of the deaminated, deacidified fluid stream.

Figure 2:
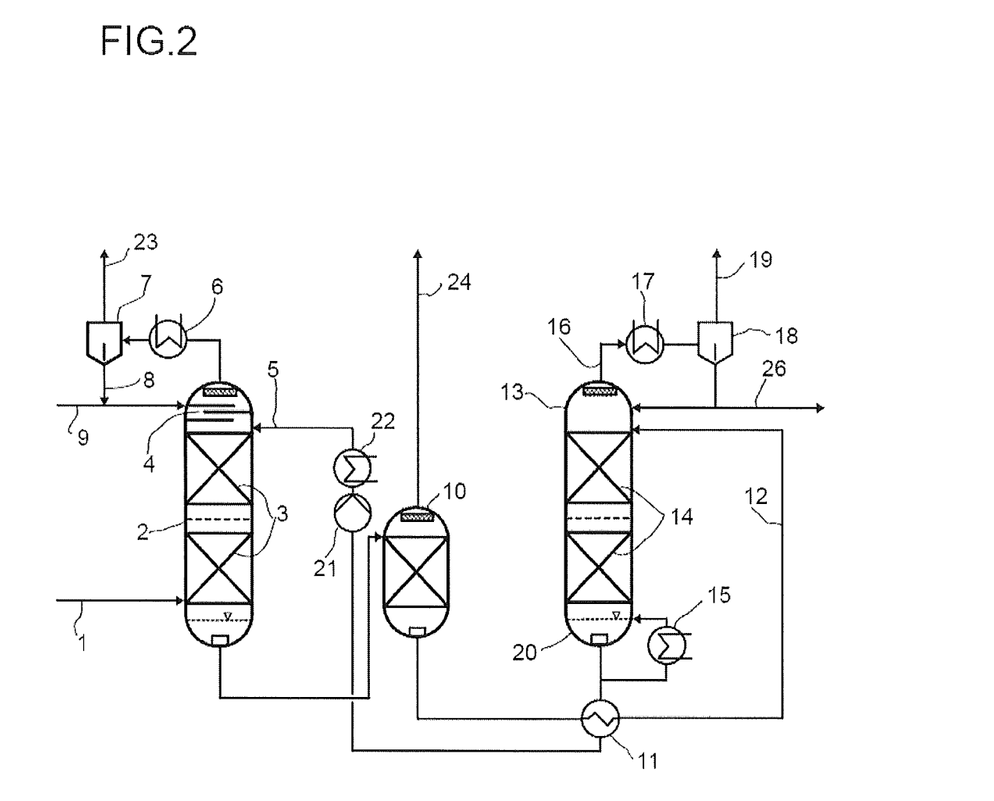
FIG. 2 shows schematically a plant for carrying out a process not according to the invention, wherein, for maintenance of the water balance, some of the aqueous condensate is passed out of the desorbed acid gases, wherein the acid gases are not conducted through an enrichment zone.

FIG. 2 shows schematically a plant for carrying out a process not according to the invention, wherein, for maintenance of the water balance, some of the aqueous condensate is passed out of the desorbed acid gases, wherein the acid gases are not conducted through an enrichment zone.

Figure 3:
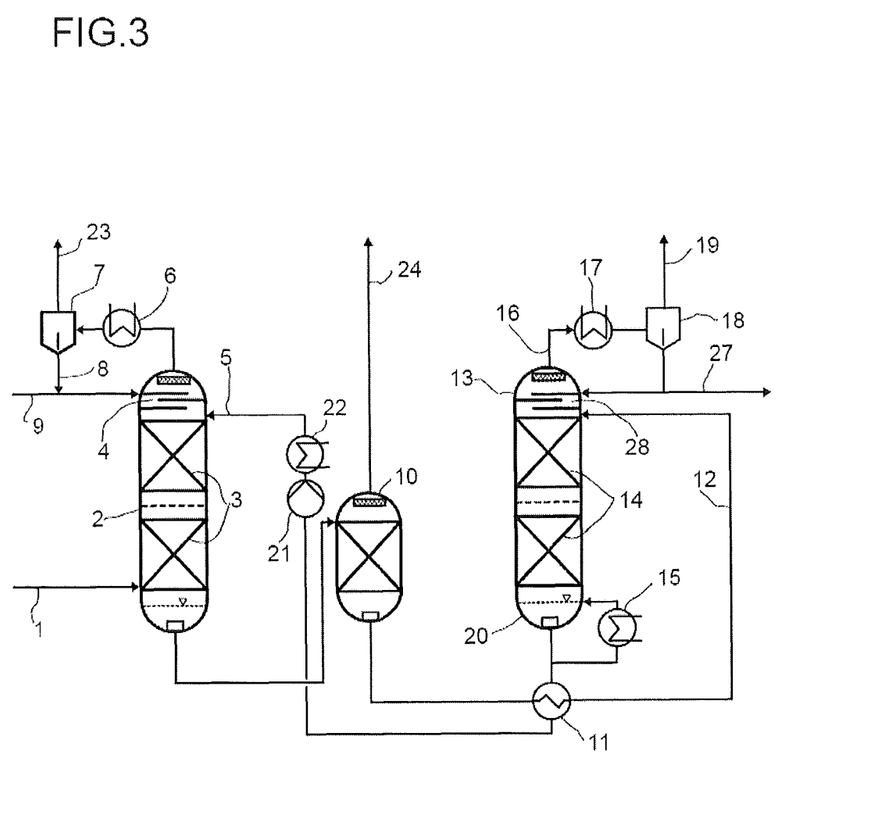
FIG. 3 shows a plant suitable for carrying out the process according to the invention. The desorbed acid gases are conducted through an enrichment zone before a desorber top condensate is condensed out of the desorbed acid gases and in part passed out.

FIG. 3 shows a plant suitable for carrying out the process according to the invention. The desorbed acid gases are conducted through an enrichment zone before a desorber top condensate is condensed out of the desorbed acid gases and in part passed out.

According to FIG. 1, a water-comprising fluid stream 1 is passed into the lower part of an absorption column 2. The absorption column 2 has an absorption zone 3 and a scrubbing zone 4. In the absorption zone 3, the water-comprising fluid stream is contacted in counterflow with an absorbent that is introduced into the absorption column 2 above the absorption zone via the line 5. The deacidified fluid stream is scrubbed in the scrubbing zone 4 with an aqueous condensate and fresh water, wherein the aqueous condensate is obtained by cooling the deaminated, deacidified fluid stream in cooler 6, collected in the phase separation vessel 7 and passed via line 8 into the scrubbing zone. Fresh water is brought in via line 9. The treated gas stream leaves the phase separation vessel 7 via the line 23. Some of the aqueous condensate is passed out via line 25, whereby the accumulation of water in the absorbent is prevented.

The absorbent loaded with acid gases is withdrawn at the bottom of the absorption column 2 and expanded into the expansion vessel 10 via a throttle valve (which is not shown). The expansion leads to the desorption of co-absorbed components of the fluid stream and some of the acid gases which are taken off via stream 24. The expanded absorbent is conducted via a heat exchanger 11 and line 12 into a desorption column 13. The desorption column 13 has a desorption zone 14. In the lower part of the desorption column 13, the expanded absorbent is heated via the evaporator 15 and partially vaporized. Via the temperature elevation, the absorbed acid gases are released. The acid gases are removed at the top of the desorption column 13 via the line 16 and fed to the cooler 17. At the cooler 17, a desorber top condensate is obtained that is collected in the phase separation vessel 18 and returned to the desorption column. The acid gases are withdrawn as stream 19. The regenerated absorbent 20 is returned back to the absorption column 2 via the heat exchanger 11, pump 21, the cooler 22 and line 5.

In FIG. 2, the same reference signs have the same meaning as in FIG. 1. In contrast to FIG. 1, no aqueous condensate is passed out of the phase separation vessel 7. For maintenance of the water balance, some of the desorber top condensate which arises in the phase separation vessel 18 is passed out via line 26.

FIG. 3 shows an embodiment according to the invention. In FIG. 3, the same reference signs have the same meaning as in FIG. 1. Compared with the process shown in FIG. 2, in the upper region of the desorption column the enrichment zone 28 has been integrated. For maintenance of the water balance, some of the desorber top condensate which arises in the phase separation vessel 18 is passed out via line 27.

EXAMPLES

Comparative Example 1

Calculations were carried out using a simulation model. The basis of the simulation model is a thermodynamic model on the basis of the electrolyte-NRTL approach of Chen et al. (Chen, C. C; Evans, L. B.: A local Composition Model for the Excess Gibbs Energy of Aqueous Electrolyte Solutions, AIChE J. (1986) 32(3), 444), using which the phase equilibria for this system can be described. The simulation of the absorption processes is described using a mass transfer-based approach; details for this are described by Asprion (Asprion, N.: Nonequilibrium Rate-Based Simulation of Reactive Systems: Simulation Model, Heat Transfer, and Influence of Film Discretization, Ind. Eng. Chem. Res. (2006) 45(6), 2054-2069).

A process in a plant according to FIG. 1 was simulated. The absorption column 2 had a diameter of 2220 mm and had two random packings 3 (INTALOX® Metal Tower Packing IMTP 25, Koch-Glitsch, Wichita USA), each having a packed height of 4 meters. The scrubbing zone 4 comprised 3 trays. The desorption column 13 had a diameter of 1220 mm and had two random packings 14 (PRM 35, from Pall Corporation, Port Washington, N.Y., USA), each having a packed height of 5 meters.

An aqueous solution having 32% by weight of methyldiethanolamine and 8% by weight of piperazine was used as absorbent. The absorbent was passed into the absorption zone at 60262 kg/h at a temperature of 40° C. via line 5. As water-comprising fluid stream, 151609 kg/h of natural gas (88.52% by volume $CH_4$, 9.72% by volume $C_2H_6$, 0.94% by volume $CO_2$, 0.58% by volume $N_2$, 0.23% by volume $H_2O$) were fed at a temperature of 35° C. and a pressure of 53.7 bar. The feed of scrubbing water into the scrubbing zone 4 was 197 kg/h, wherein the scrubbing water comprised 194 kg/h of recycled aqueous condensate cooled to 22° C. and 3 kg/h of fresh water (makeup water). From the total of 358 kg/h of aqueous condensate arising via cooler 6 and phase separation vessel 7, 164 kg/h were passed out via line 25. Via line 23, 147205 kg/h of treated natural gas left the process at a temperature of 22° C., a pressure of 53.6 bar, a water content of 0.094% by volume and a $CO_2$ content of 2 ppm by volume. 64505 kg/h of absorption solution loaded with acid gases were taken off at a temperature of 39.8° C. at the lower end of the absorption zone and expanded to a pressure of 6 bar into the expansion vessel 10. At the top of the expansion vessel 10, 639 kg/h of desorbed gases were taken off which substantially comprised methane and ethane.

The absorbent was withdrawn at the sump of the expansion vessel 10 and conducted via the heat exchanger 11 into the desorption column 13 and heated therein by the evaporator 15 to 130.9° C. The desorbed acid gases were cooled from 113.5° C. to 40° C. in the cooler 17. The 2272 kg/h of aqueous phase formed in this process were separated off from the acid gases in the phase separation unit 18 and passed back into the desorption column.

The annual amine loss of the plant is 6.366 t; this is equivalent to 53% of the 12 t of amine originally used.

Comparative Example 2

A process in a plant according to FIG. 2 was simulated. The structure of the absorption column 2 and desorption column 13 corresponds to that of comparative example 1.

The composition of the absorbent and the fluid stream corresponds to comparative example 1. The absorbent was passed into the absorption zone via line 5 at 60263 kg/h at a temperature of 40° C. 151609 kg/h of natural gas were fed a temperature of 35° C. and a pressure of 53.7 bar. The feed of scrubbing water into the scrubbing zone 4 was 361 kg/h wherein the scrubbing water comprised 358 kg/h of recycled aqueous condensate cooled to 22° C. and 3 kg/h of fresh water. Via line 23, 147206 kg/h of treated natural gas left the process at a temperature of 22° C., a pressure of 53.6 bar, a water content of 0.094% by volume and a $CO_2$ content of 3 ppm by volume. 64834 kg/h of absorption solution loaded with acid gases were passed out at the lower end of the absorption zone at a temperature of 39.8° C. and expanded to a pressure of 6 bar into the expansion vessel 10. At the top of the expansion vessel 10, 638 kg/h desorbed gases desorbed gases were taken off which comprised substantially methane and ethane.

The absorbent was taken off at the sump of the expansion vessel 10 and conducted via the heat exchanger 11 into the desorption column 13 and heated therein by the evaporator 15 to 130.8° C. The desorbed acid gases were cooled in the cooler 17 from 113.5° C. to 40° C. The 2102 kg/h of aqueous phase formed in this process were separated off from the acid gases in the phase separation unit 18. 165 kg/h were removed from the desorber top condensate and the remainder passed back into the desorption column.

The annual amine loss is 5.671 t; this is equivalent to 47% of the 12 t of amine originally used.

Example 3 According to the Invention

A process according to the invention was simulated in a plant according to FIG. 3. The structure of the absorption column 2 and desorption column 13 corresponds to the comparative example 1, wherein, however, in the desorption column, above the feed of the loaded absorption medium via line 12, an enrichment zone 28 had been installed which had 4 trays.

The composition of the absorbent and the fluid stream corresponds to comparative example 1. The absorbent was passed into the absorption zone via line 5 at 60279 kg/h at a temperature of 40° C. 151609 kg/h of natural gas were fed at a temperature of 35° C. and a pressure of 53.7 bar. The feed of scrubbing water into the scrubbing zone 4 was 363 kg/h, wherein the scrubbing water comprised 359 kg/h of recycled aqueous condensate cooled to 22° C. and 4 kg/h of fresh water. Via line 23, 147208 kg/h of treated natural gas left the process at a temperature of 22° C., a pressure of 53.6 bar, a water content of 0.094% by volume and a $CO_2$ content of 3 ppm by volume. 64849 kg/h of absorption solution loaded with acid gases were passed out at the lower end of the absorption zone at a temperature of 39.8° C. and expanded to a pressure of 6 bar into the expansion vessel 10. At the top of the expansion vessel 10, 636 kg/h of desorbed gases were taken off which substantially comprised methane and ethane.

The absorbent was taken off at the sump of the expansion vessel 10 and conducted via the heat exchanger 11 into the desorption column 13 and heated therein by the evaporator 15 to 130.8° C. The desorbed acid gases were cooled in the cooler 17 from 113.4° C. to 40° C. The 1875 kg/h of aqueous phase formed in this process were separated off from the acid gases in the phase separation unit 18. From the desorber top condensate, 165 kg/h were removed and the remainder was passed back into the desorption column.

The annual amine loss is 0.396 t; this is equivalent to 3.3% of the 12 t of amine originally used.

Example 4 According to the Invention

Example 3 is repeated, but the enrichment zone 28 had 5 trays.

The absorbent was passed into the absorption zone at 60279 kg/h at a temperature of 40° C. via line 5. 151609 kg/h of natural gas were fed at a temperature of 35° C. and a pressure of 53.7 bar. The feed of scrubbing water into the scrubbing zone 4 was 364 kg/h, wherein the scrubbing water comprised 359 kg/h of recycled aqueous condensate cooled to 22° C. and 5 kg/h of fresh water. Via line 23, 147208 kg/h of treated natural gas left the process at a temperature of 22° C., a pressure of 53.6 bar, a water content of 0.094% by volume and a $CO_2$ content of 3 ppm by volume. 64849 kg/h of absorption solution loaded with acid gases were passed out at the lower end of the absorption zone at a temperature of 39.8° C. and expanded to a pressure of 6 bar into the expansion vessel 10. At the top of the expansion vessel 10, 636 kg/h of desorbed gases were taken off which comprised substantially methane and ethane.

The absorbent was taken off at the sump of the expansion vessel 10 and conducted via the heat exchanger 11 into the desorption column 13 and heated therein by the evaporator 15 to 130.8° C. The desorbed acid gases were cooled from 113.4° C. to 40° C. in the cooler 17. The 1875 kg/h of aqueous phase formed in this process were separated off from the acid gases in the phase separation unit 18. From the desorber top condensate, 165 kg/h were removed and the remainder was passed back into the desorption column.

The annual amine loss is 0.231 t; this is equivalent to 1.93% of the 12 t of amine originally used.

Example 5 According to the Invention

Example 3 is repeated, but the enrichment zone 28 had 6 trays.

The absorbent was passed into the absorption zone via line 5 at 60279 kg/h at a temperature of 40° C. 151609 kg/h of natural gas were fed at a temperature of 35° C. and a pressure of 53.7 bar. The feed of scrubbing water into the scrubbing zone 4 was 364 kg/h, wherein the scrubbing water comprised 359 kg/h of recycled aqueous condensate cooled to 22° C. and 5 kg/h of fresh water. Via line 23, 147208 kg/h of treated natural gas left the process at a temperature of 22° C., a pressure of 53.6 bar, a water content of 0.094% by volume and a $CO_2$ content of 3 ppm by volume. 64849 kg/h of absorption solution loaded with acid gases were passed out at the lower end of the absorption zone at a temperature of 39.8° C. and expanded to a pressure of 6 bar into the expansion vessel 10. At the top of the expansion vessel 10, 636 kg/h of desorbed gases were taken off that comprised substantially methane and ethane.

The absorbent was taken off at the sump of the expansion vessel 10 and conducted via heat exchanger 11 into the desorption column 13 and heated there to 130.8° C. by the evaporator 15. The desorbed acid gases were cooled from 113.4° C. to 40° C. in the cooler 17. The 1875 kg/h of aqueous phase formed in this process were separated off from the acid gases in the phase separation unit 18. From the desorber top condensate, 165 kg/h were removed and the remainder was passed back into the desorption column.

The annual amine loss is 0.152 t; this is equivalent to 1.27% of the 12 t of amine originally used.

Example 6 According to the Invention

Example 3 is repeated, but the enrichment zone 28 had 8 trays.

The absorbent was passed into the absorption zone via line 5 at 60279 kg/h at a temperature of 40° C. 151609 kg/h of natural gas were fed at a temperature of 35° C. and a pressure of 53.7 bar. The feed of scrubbing water into the scrubbing zone 4 was 364 kg/h, wherein the scrubbing water comprised 359 kg/h of recycled aqueous condensate cooled to 22° C. and 5 kg/h of fresh water. Via line 23, 147208 kg/h of treated natural gas left the process at a temperature of 22° C., a pressure of 53.6 bar, a water content of 0.094% by volume and a $CO_2$ content of 3 ppm by volume. 64849 kg/h of absorption solution loaded with acid gases were passed out at the lower end of the absorption zone at a temperature of 39.8° C. and expanded to a pressure of 6 bar into the expansion vessel 10. At the top of the expansion vessel 10, 636 kg/h of desorbed gases were taken off that comprised substantially methane and ethane.

The absorbent was taken off at the bottom of the expansion vessel 10 and conducted via the heat exchanger 11 into the desorption column 13 and heated therein to 130.8° C. by the evaporator 15. The desorbed acid gases were cooled from 113.4° C. to 40° C. in the cooler 17. The 1875 kg/h of aqueous phase formed in this process were separated off from the acid gases in the phase separation unit 18. From the desorber top condensate, 165 kg/h were removed and the remainder passed back into the desorption column.

The annual amine loss is 0.095 t; this is equivalent to 0.80% of the 12 t of amine originally used.

The invention claimed is:
1. A process for separating off acid gases from a water-comprising fluid stream, said process comprising
   a) contacting the water-comprising fluid stream in an absorption zone with an absorbent that comprises at least one amine, wherein a deacidified fluid stream and an acid gas-loaded absorbent is obtained, b) contacting the deacidified fluid stream in a scrubbing zone with a single pass of an aqueous scrubbing liquid to transfer at least in part entrained amine in the deacidified fluid stream to the scrubbing liquid, the scrubbing liquid flowing out of the scrubbing zone without recirculating to the scrubbing zone, and a deaminated, deacidified fluid stream and an amine-loaded scrubbing liquid are obtained, c) cooling the deaminated, deacidified fluid stream in an indirect cooler downstream of the scrubbing zone, wherein an absorber top condensate is condensed out of the deaminated, deacidified fluid stream, d) passing the loaded absorbent into a desorption zone in which acid gases are at least in part released, wherein a regenerated absorbent and desorbed acid gases are obtained, e) returning the regenerated absorbent to the absorption zone in order to form an absorbent circuit, f) introducing the amine-loaded scrubbing liquid and the absorber top condensate into the absorbent circuit, and g) conducting the desorbed acid gases through an enrichment zone and cooling the acid gases exiting at the top of the enrichment zone, in order to condense out of the acid gases a desorber top condensate which in part is returned to the enrichment zone and in part is passed out of the process.

2. The process of claim 1, wherein the desorber top condensate comprises less than 500 ppm by weight of amines and amine decomposition products.

3. The process of claim 1, wherein the scrubbing liquid comprises absorber top condensate, desorber top condensate and/or fresh water.

4. The process of claim 1, wherein the amine-loaded scrubbing liquid is passed into the absorption zone.

5. The process of claim 1, wherein the deaminated, deacidified fluid stream is cooled to a temperature which is lower than the temperature of the water-comprising fluid stream.

6. The process of claim 1, wherein the enrichment zone comprises a structured packing, a random packing, or a plurality of trays.

7. The process of claim 6, wherein the structured packing or the random packing comprises a height of at least 1.5 meters.

8. The process of claim 6, wherein the number of the trays is at least 4.

9. The process of claim 1, wherein the loaded absorbent is regenerated in the desorption zone by at least one measure selected from expansion, stripping with an inert gas, or heating.

10. The process of claim 9, wherein the absorbent loaded with acid gases is preheated by indirect heat exchange with the regenerated absorbent prior to entry into the desorption zone.

11. The process of claim 1, wherein the loaded absorbent is expanded into an expansion vessel, wherein a gas phase and an expanded absorbent are obtained, and the expanded absorbent is passed into the desorption zone.

12. The process of claim 11, wherein at least a part of the absorber top condensate is introduced into the expansion vessel.

13. The process of claim 1, wherein the water-comprising fluid stream has a water content which is at least 20% of the saturation concentration of water.

14. The process of claim 1, wherein the water-comprising fluid stream is introduced into the absorption zone at a pressure of 50 to 70 bar.

15. The process of claim 1, wherein the water-comprising fluid stream has an acid gas partial pressure of less than 2.5 bar.

16. The process of claim 1, wherein the water-comprising fluid stream is selected from
   a) natural gas,
   b) synthesis gas,
   c) off-gases of various refinery processes,
   d) combustion gases, or
   e) gas that is obtained from a Claus process.

17. The process of claim 1, wherein the water-comprising fluid stream has a water content which is at least 20% of the saturation concentration of water, an acid gas partial pressure of less than 2.5 bar, and is introduced into the absorption zone at a pressure of 50 to 70 bar.

* * * * *